US008931014B2

(12) United States Patent
Yamamoto (10) Patent No.: US 8,931,014 B2
(45) Date of Patent: Jan. 6, 2015

(54) DIGITAL BROADCASTING RECEIVING APPARATUS

(75) Inventor: Naoki Yamamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1039 days.

(21) Appl. No.: 12/222,943

(22) Filed: Aug. 20, 2008

(65) Prior Publication Data

US 2009/0055874 A1 Feb. 26, 2009

(30) Foreign Application Priority Data

Aug. 21, 2007 (JP) ................. 2007-215217

(51) Int. Cl.
| | | |
|---|---|---|
| G06F 13/00 | (2006.01) | |
| H04N 5/445 | (2011.01) | |
| H04N 21/472 | (2011.01) | |
| H04N 21/4147 | (2011.01) | |
| H04N 21/422 | (2011.01) | |
| H04N 21/431 | (2011.01) | |
| H04N 21/433 | (2011.01) | |
| H04N 21/435 | (2011.01) | |
| H04N 21/84 | (2011.01) | |

(52) U.S. Cl.
CPC ..... *H04N 5/44543* (2013.01); *H04N 21/47214* (2013.01); *H04N 21/4147* (2013.01); *H04N 21/4221* (2013.01); *H04N 21/4312* (2013.01); *H04N 21/4334* (2013.01); *H04N 21/435* (2013.01); *H04N 21/84* (2013.01)
USPC ........................................ 725/58; 348/734

(58) Field of Classification Search
CPC .......... H04N 21/4147; H04N 21/4334; H04N 21/47214; H04N 21/84; H04N 21/4221
See application file for complete search history.

(56) References Cited

U.S. PATENT DOCUMENTS

| | | | | |
|---|---|---|---|---|
| 6,951,031 | B2 * | 9/2005 | Hatano | 725/50 |
| 2005/0028205 | A1 * | 2/2005 | Nishimura et al. | 725/46 |
| 2010/0175090 | A1 * | 7/2010 | Cordray | 725/58 |
| 2010/0319026 | A1 * | 12/2010 | Ellis et al. | 725/40 |
| 2011/0035775 | A1 * | 2/2011 | Patel et al. | 725/59 |

FOREIGN PATENT DOCUMENTS

JP 2007-088893 4/2007

* cited by examiner

*Primary Examiner* — Rong Le
(74) *Attorney, Agent, or Firm* — Morgan, Lewis & Bockius LLP (57) ABSTRACT

A broadcasting recording apparatus for making a recording reservation with good usability includes a batch recording accepting unit for accepting a batch recording reservation based on an operational input accepted via a remote controller, the batch recording reservation being an operational input for making a set of recording reservations of TV programs corresponding to a TV program recorded in a predetermined period of time that is set in advance, a name extracting unit for extracting recorded program name information from a video storage unit when the batch recording reservation is accepted, the recorded program name information being program name information of the TV program recorded in the predetermined period of time among video information stored in the video storage unit, a TV program decision unit for deciding whether or not the electronic program guide includes program name information matching with the recorded program name information, and a recording reservation unit for making a recording reservation of a TV program corresponding to the program name information if it is decided that the program name information matching with the recorded program name information is included.

5 Claims, 5 Drawing Sheets

| RECORDING DATE | RECORDING TIME | CH | PROGRAM NAME |
|---|---|---|---|
| . . . | . . . | . . . | . . . |
| APRIL 5 | 15:00-16:00 | 4 | PPPP |
| APRIL 8 | 19:00-20:00 | 8 | AAAA |
| APRIL 9 | 19:30-20:00 | 6 | BBBB |
| APRIL 11 | 20:00-23:00 | 10 | CCCC |
| APRIL 12 | 21:00-22:00 | 6 | DDDD |

FIG.5B

| FLAG | RECORDING DATE | RECORDING TIME | CH | PROGRAM NAME |
|---|---|---|---|---|
| ○ | APRIL 8 | 19:00-20:00 | 8 | AAAA |
| × | ---- | ---- |  | BBBB |
| × | ---- | ---- |  | CCCC |
| ○ | APRIL 12 | 21:00-22:00 | 6 | DDDD |

401a  401b  401c  401d  401e 400  401

DIGITAL BROADCASTING RECEIVING APPARATUS

This application is based on Japanese Patent Application No. 2007-215217 filed on Aug. 21, 2007, and the contents of which are hereby incorporated by reference.

BACKGROUND OF THE INVENTION

1. Field of the Invention

The present invention relates to a broadcasting recording apparatus for receiving television broadcast and for storing the received video information. In particular, the present invention relates to a broadcasting recording apparatus that is connected to a remote controller and a monitor for communicating with each other, and receives television broadcast so as to store the received video information.

2. Description of Related Art

Conventionally, the broadcasting recording apparatus such as a hard disk drive (HDD) recorder, which receives television broadcast and stores the received video information, are capable of recording many TV programs on schedule since a storage capacity of the recording medium such as a hard disk has increased.

On the other hand, the TV programs include a TV series program that is broadcasted on the same day every week from the same time as predetermined. As the TV series program, there is a TV drama, an animation program or the like. There are proposed various apparatuses and methods for performing the schedule recording with good usability when a user wants to perform the schedule recording of the TV series program.

For instance, JP-A-2007-88893 discloses a recording programming apparatus that includes an obtaining portion for obtaining a program guide transmitted via broadcasting or a network, a setting portion for setting a series scheduling for scheduling repeatedly any program in the program guide obtained by the obtaining portion, a "program in the same time slot" deciding portion for deciding a "program in the same time slot" that is a TV program that has a program name corresponding to the series scheduling set by the setting portion and is to be broadcasted on the same time slot in a plurality of days in a week, and an automatic scheduling portion for searching a program name from the program guide obtained by the obtaining portion and for automatically scheduling TV programs having a program name that is partially or entirely the same as the name of that of the TV program decided by the "program in the same time slot" deciding portion to be the "program in the same time slot" among the program names corresponding to the series scheduling set by the setting portion.

However, the conventional broadcasting recording apparatus such as the recording programming apparatus described above requires a user to set a recording reservation for each TV program, so it is not convenient. In addition, although the storage capacity of the recording medium such as the hard disk for storing TV program information has increased, enormous storage capacity may be required if all the TV series programs desired by the user should be programmed by the series scheduling.

SUMMARY OF THE INVENTION

It is an object of the present invention to provide a broadcasting recording apparatus that enables recording reservation with good usability.

A broadcasting recording apparatus according to a first aspect of the present invention for receiving television broadcast and for storing video information includes a receiving unit for receiving television broadcast, a video storage unit for storing video information corresponding to a plurality of TV programs received via the receiving unit in association with program name information and recording date and time information, a batch recording accepting unit for accepting a batch recording reservation based on an operational input accepted from outside, the batch recording reservation being an operational input for making a set of recording reservations of TV programs corresponding to a TV program recorded in a predetermined period of time that is set in advance, a name extracting unit for extracting recorded program name information from the video storage unit when the batch recording accepting unit accepts the batch recording reservation, the recorded program name information being program name information of the TV program recorded in the predetermined period of time among video information stored in the video storage unit, a program guide obtaining unit for obtaining an electronic program guide via the receiving unit, a TV program decision unit for deciding whether or not the electronic program guide obtained by the program guide obtaining unit includes program name information matching with the recorded program name information extracted by the name extracting unit, and a recording reservation unit for making a recording reservation of a TV program corresponding to the program name information via the electronic program guide obtained by the program guide obtaining unit if the TV program decision unit decides that the program name information matching with the recorded program name information is included.

A broadcasting recording apparatus according to a second aspect of the present invention, which is also the broadcasting recording apparatus according to the first aspect of the present invention, is connected to a remote controller for communicating with each other, and the batch recording accepting unit accepts the batch recording reservation when a specific key of the remote controller is pressed.

A broadcasting recording apparatus according to a third aspect of the present invention, which is also the broadcasting recording apparatus according to the first or the second aspect of the present invention, is connected to a monitor for displaying video information for communicating with each other, and further includes a reservation status display unit for displaying recording reservation flag information on the monitor in association with the recorded program name information extracted by the name extracting unit when at least one recorded program name information is extracted by the name extracting unit, the recording reservation flag information indicating whether or not the recording reservation unit has reserved recording.

As for a broadcasting recording apparatus according to a fourth aspect of the present invention, which is also the broadcasting recording apparatus according to the third aspect of the present invention, the reservation status display unit displays at least one of scheduled recording date and time information of the TV program for which a recording reservation is made and channel number information as a broadcasting channel number in association with the recorded program name information extracted by the name extracting unit when the recording reservation unit has reserved recording.

A broadcasting recording apparatus according to a fifth aspect of the present invention, which is also the broadcasting recording apparatus according to any one of the first to the fourth aspects of the present invention, further includes a period setting unit for setting a predetermined period of time based on an operational input accepted from outside.

According to the broadcasting recording apparatus of the first aspect of the present invention, the video information corresponding to a plurality of TV programs received via the receiving unit are stored in the video storage unit in association with the program name information and the recording date and time information. The batch recording reservation that is an operational input for making a set of recording reservations of TV programs corresponding to a TV program recorded in a predetermined period of time that is set in advance is accepted based on an operational input accepted from outside. Then, if the batch recording reservation is accepted, the recorded program name information that is program name information of the TV program recorded in a predetermined period of time among video information stored in the video storage unit is extracted from the video storage unit. In addition, an electronic program guide is obtained via the receiving unit, and it is decided whether or not the obtained electronic program guide includes program name information matching with the extracted recorded program name information. If it is decided that the program name information matching with the recorded program name information is included, recording reservation of the TV program corresponding to the program name information is performed via the obtained electronic program guide. Therefore, the recording reservation can be performed with good usability.

More specifically, when the batch recording reservation is accepted, the recorded program name information that is program name information of the TV program recorded in a predetermined period of time among video information stored in the video storage unit is extracted from the video storage unit. It is decided whether or not program name information matching with the extracted recorded program name information is included in the electronic program guide. If it is decided that the program name information matching with the recorded program name information is included, recording reservation of the TV program corresponding to the program name information is performed. Since a set of recording reservations are performed for TV programs whose program name information matching with the recorded program name information as the program name information is included in the electronic program guide among the TV programs recorded in a predetermined period of time, it is not necessary to make recording reservation individually for the TV programs. Therefore, the recording reservation can be performed with good usability.

According to the broadcasting recording apparatus of the second aspect of the present invention, when a specific key of the remote controller is pressed, the batch recording reservation is accepted. Therefore, the recording reservation can be performed with better usability.

According to the broadcasting recording apparatus of the third aspect of the present invention, if at least one recorded program name information is extracted, the recording reservation flag information that indicates whether or not the recording reservation unit has reserved recording is displayed on the monitor in association with the extracted recorded program name information. Therefore, the recording reservation can be performed with better usability.

More specifically, since the recording reservation flag information that is information indicating whether or not recording reservation has been performed for the TV program recorded in a predetermined period of time is displayed on the monitor, the user can visually check whether or not recording of the desired TV program is reserved for the schedule recording. Therefore, the recording reservation can be performed with better usability.

According to the broadcasting recording apparatus of the fourth aspect the present invention, if the recording reservation is made, at least one of scheduled recording date and time information of the TV program for which a recording reservation is made and channel number information as a broadcasting channel number is displayed in association with the extracted recorded program name information. Therefore, the recording reservation can be performed with better usability.

More specifically, since at least one of scheduled recording date and time information of the TV program for which a recording reservation is made and channel number information as a broadcasting channel number is displayed in association with the extracted recorded program name information when the recording reservation is made, the user can check whether or not the TV program that is reserved for recording matches the desired TV program for setting the schedule recording via at least one of the scheduled recording date and time information and the channel number information as a broadcasting channel number. Therefore, the recording reservation can be performed with better usability.

According to the broadcasting recording apparatus of the fifth aspect of the present invention, a predetermined period of time for extracting TV programs to be targets of the batch recording reservation is set based on the operational input accepted from outside, so that the user can set a desired predetermined period of time arbitrarily. Therefore, the recording reservation can be performed with better usability.

More specifically, a user who often makes the batch recording reservation can set a relatively short period of time (e.g., three days) as the predetermined period of time while a user who seldom makes the batch recording reservation can set a relatively long period of time (e.g., a week) as the predetermined period of time. Therefore, the recording reservation can be performed with better usability.

DETAILED DESCRIPTION OF THE PREFERRED EMBODIMENTS

Figure 1:
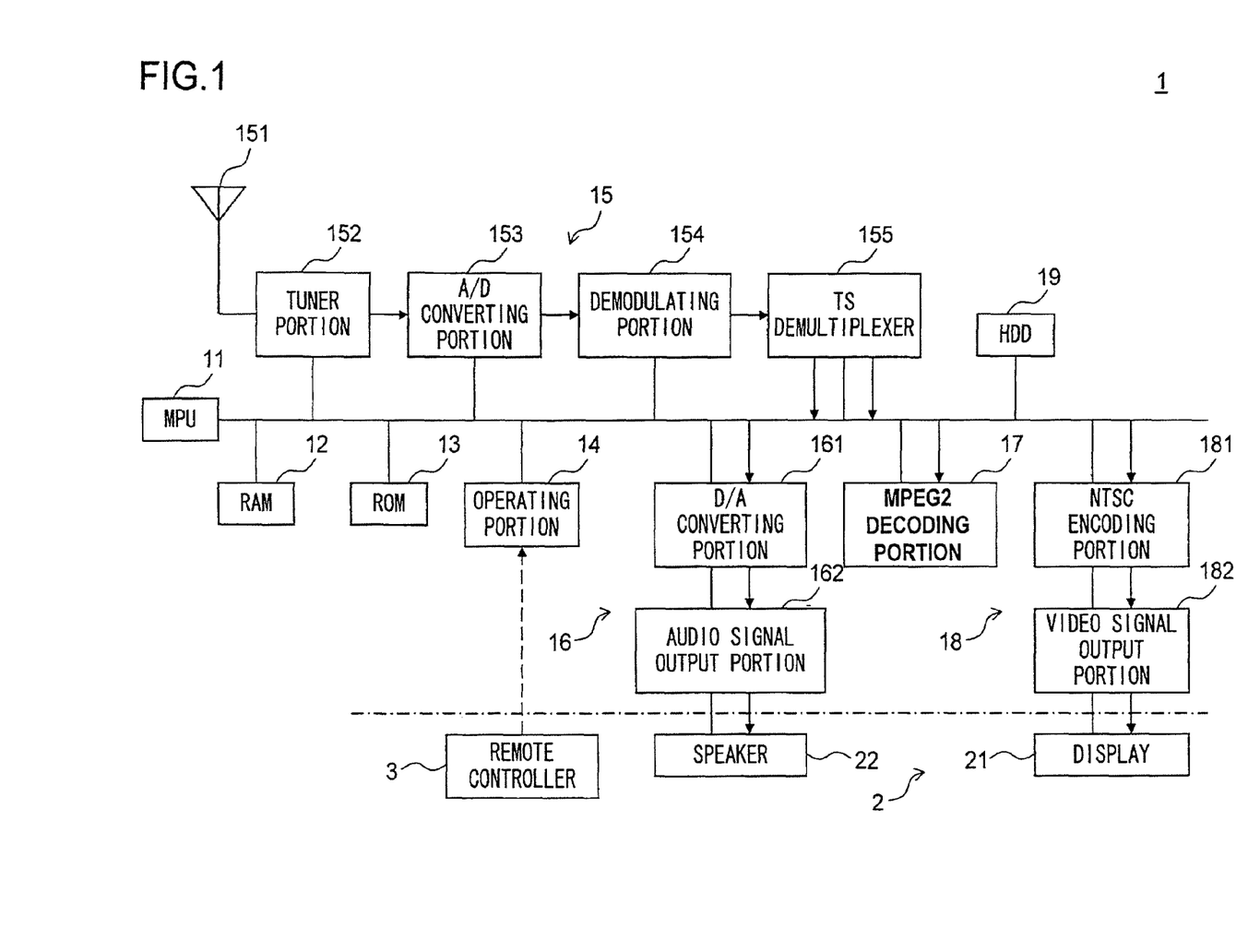
FIG. 1 is a block diagram showing an example of a structure of an HDD recorder according to the present invention.

Hereinafter, embodiments of the present invention will be described with reference to the attached drawings. FIG. 1 is a block diagram showing an example of a structure of a hard disk drive (HDD) recorder 1 as a broadcasting recording apparatus according to the present invention. The HDD recorder 1 is connected to an output device 2 for communicating with each other and is connected to a remote controller 3 for communicating with each other using infrared communication.

The HDD recorder 1 receives television broadcast based on an operational input accepted from a user via the remote controller 3 and stores received TV program information including video information and audio information in an HDD 19. In addition, the HDD recorder 1 reads out and reproduces the TV program information stored in the HDD 19 based on an operational input accepted from the user via the remote controller 3, so that its pictures and sounds are output from the output device 2.

The output device 2 includes a display 21 and a speaker 22 for outputting the audio information and the video information supplied from the HDD recorder 1. The display 21 (corresponding to the monitor) includes a liquid crystal display (LCD), a plasma display panel (PDP) or the like for displaying pictures corresponding to the video information supplied from the HDD recorder 1 so that the pictures can be viewed externally. The speaker 22 produces sounds corresponding to the audio information supplied from the HDD recorder 1.

The remote controller 3 (corresponding to a part of the batch recording accepting unit and a part of the period setting unit) generates an infrared signal corresponding to the operational input accepted from the user and delivers the infrared signal to the HDD recorder 1.

In addition, the HDD recorder 1 includes a micro processing unit (MPU) 11, a random access memory (RAM) 12, a read only memory (ROM) 13, an operating portion 14, a receiving portion 15, an audio output portion 16, a Motion Picture Experts Group 2 (MPEG2) decoding portion 17, an image output portion 18 and an HDD 19.

The MPU 11 controls a general action of the HDD recorder 1. The RAM 12 stores information including the audio information and the video information in a readable and rewritable manner. The ROM 13 stores a control program and the like for making the MPU 11 work.

The operating portion 14 accepts various operations for turning on or off the power, tuning and the like. In addition, the operating portion 14 accepts various operations as operational signals from the remote controller 3 by the infrared communication. The receiving portion 15 (corresponding to the receiving unit) includes an antenna portion 151, a tuner portion 152, an A/D converting portion 153, a demodulating portion 154 and a transport stream (TS) demultiplexer 155, so as to receive and demodulate television broadcast.

The antenna portion 151 receives television broadcast waves. The tuner portion 152 selects a preset channel of broadcasting from television broadcast waves received by the antenna portion 151. The A/D converting portion 153 converts an output signal (analog signal) from the tuner portion 152 into digital information. The demodulating portion 154 demodulates an output from the A/D converting portion 153. TS demultiplexer 155 demultiplexes the demodulated output of the demodulating portion 154 into individual types of signals.

The audio output portion 16 includes a D/A converting portion 161 and an audio signal output portion 162, so as to output an audio signal corresponding to the television broadcast received by the receiving portion 15 to the speaker 22. The D/A converting portion 161 converts audio information (digital information) supplied from the TS demultiplexer 155 into an analog signal. The audio signal output portion 162 outputs the audio signal converted into the analog signal by the D/A converting portion 161 to the speaker 22.

The MPEG2 decoding portion 17 decodes the video information supplied from the TS demultiplexer 155 into video information before compression.

The image output portion 18 includes a National Television Standards Committee (NTSC) encoding portion 181 and a video signal output portion 182, so as to output the video signal decoded by the MPEG2 decoding portion 17 to the display 21. The NTSC encoding portion 181 converts the video information decoded by the MPEG2 decoding portion 17 into an NTSC television signal. The video signal output portion 182 outputs the NTSC television signal supplied from the NTSC encoding portion 181 to the display 21.

The hard disk drive (HDD) 19 stores various information such as the video information and the audio information received via the receiving portion 15 in accordance with an instruction from the MPU 11.

Next, an action when the HDD recorder 1 receives broadcasting will be described. First, the digital broadcasting waves are received by the antenna portion 151. When the tuning operation is accepted via the operating portion 14 (or the remote controller 3), the tuner portion 152 switches a receiving transponder. The received digital broadcasting wave is converted by the A/D converting portion 153 into digital information, which is demodulated by the demodulating portion 154.

Note that the digital broadcasting wave is transmitted as TS packets from a transmission side (transmission station). The TS packet includes video information, audio information, control information and the like, which are demultiplexed by the TS demultiplexer 155 and are delivered to the RAM 12 for storing them. Then, the audio information is read out from the RAM 12 and is converted by the D/A converting portion 161 into an analog signal, which is delivered via the audio signal output portion 162 to the speaker 22 for producing sounds.

In addition, the video information is read out from the RAM 12 and is converted by the MPEG2 decoding portion 17 into the video information before compression, which is converted by the NTSC encoding portion 181 into an NTSC television signal and is delivered via the video signal output portion 182 to the display 21 for displaying pictures.

Figure 2:
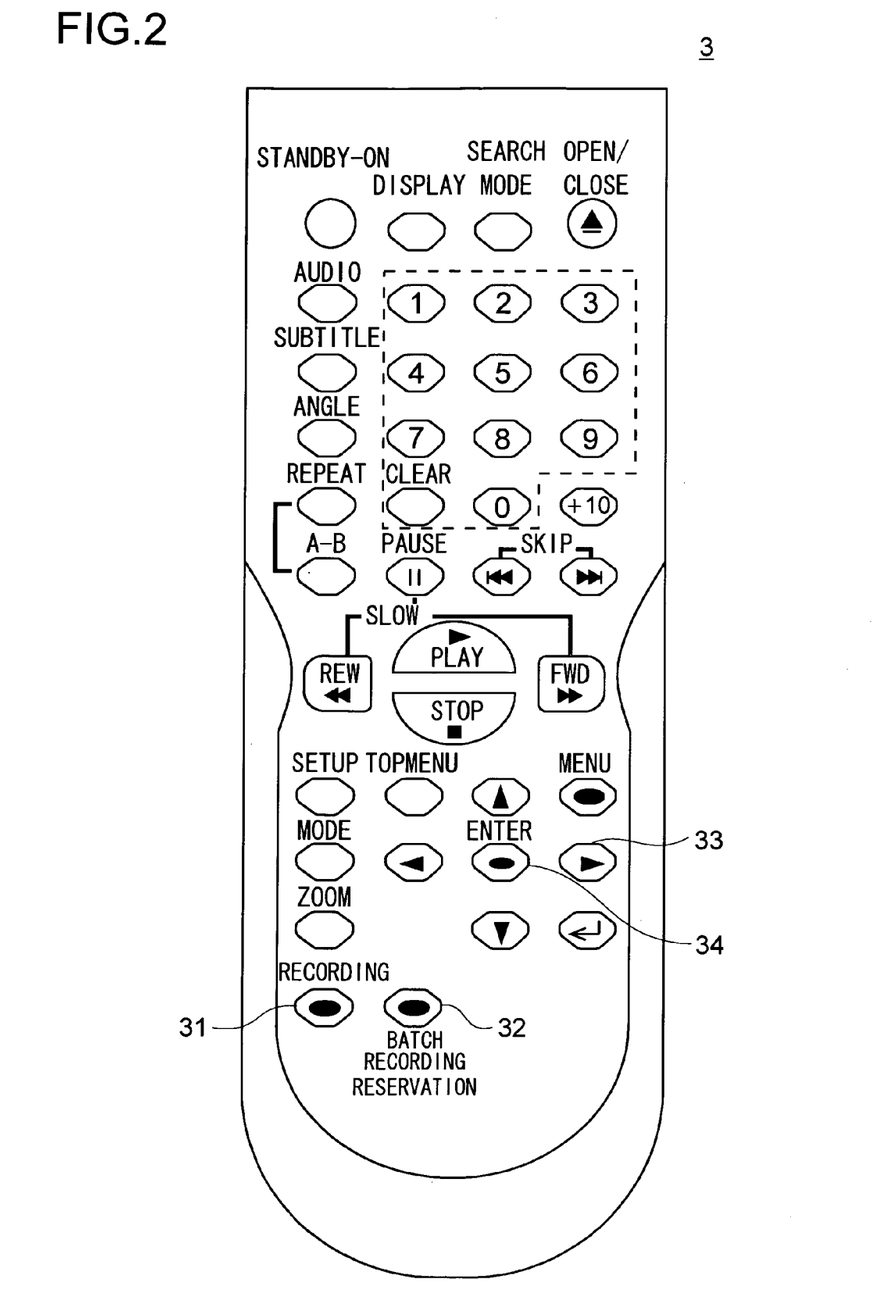
FIG. 2 is a front view showing an example of a remote controller.

FIG. 2 is a front view showing an example of the remote controller 3. The remote controller 3 has a recording key 31, a batch recording reservation key 32, direction keys 33 and an ENTER key 34. The recording key 31 is pressed for performing a recording process. The batch recording reservation key 32 (corresponding to the specific key) is pressed for making a set of recording reservations of TV programs corresponding to the TV program that has been recorded in a predetermined period of time that is set in advance (e.g., past one week), i.e., for making a batch recording reservation.

The direction keys 33 are pressed for e.g., selecting a choice from a plurality of choices displayed on the display 21 and include four keys consisting of an UP key, a DOWN key, a LEFT key and a RIGHT key. The ENTER key 34 is pressed for e.g., fixing the choice selected by the direction key 33.

Figure 3:
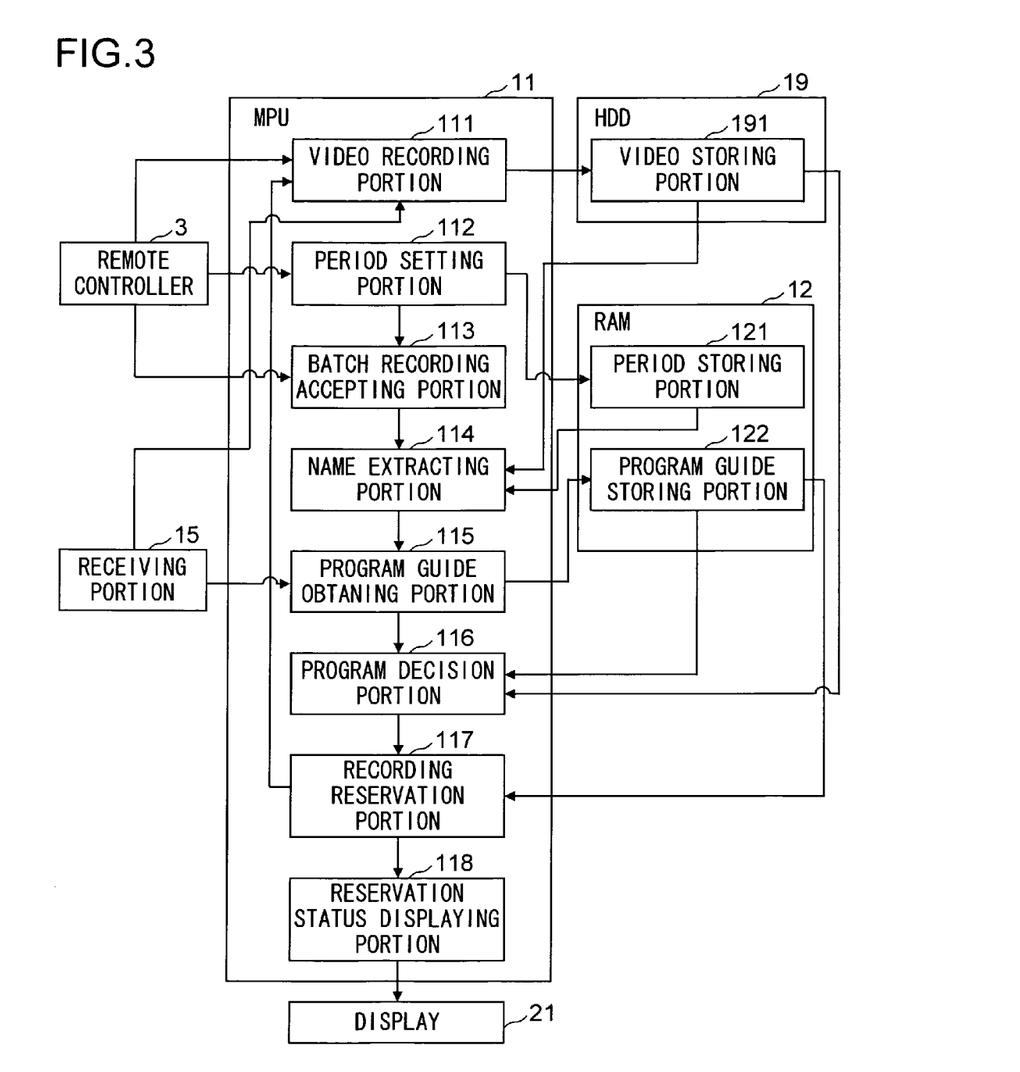
FIG. 3 is a block diagram showing an example of a structure of a main part of the HDD recorder according to the present invention.

FIG. 3 is a block diagram showing an example of a structure of a main part of the HDD recorder 1 according to the present invention. The MPU 11 includes a video recording portion 111, a period setting portion 112, a batch recording accepting portion 113, a name extracting portion 114, a program guide obtaining portion 115, a program decision portion 116, a recording reservation portion 117 and reservation status displaying portion 118, as functional portions. The HDD 19 includes a video storing portion 191. In addition, the RAM 12 includes a period storing portion 121 and a program guide storing portion 122.

In this embodiment, the MPU 11 reads out the control program stored in the ROM 13 shown in FIG. 1 or the like in advance and executes the control program so as to work as the functional portions including the video recording portion 111, the period setting portion 112, the batch recording accepting portion 113, the name extracting portion 114, the program guide obtaining portion 115, the program decision portion 116, the recording reservation portion 117, the reservation status displaying portion 118 and the like. In addition, the MPU 11 lets the HDD 19 work as the functional portions including the video storing portion 191 and the like and lets the RAM 12 work as the functional portions including the period storing portion 121, the program guide storing portion 122 and the like.

In addition, among various data stored in the RAM 12 and the ROM 13 shown in FIG. 1, data that can be stored in a removable recording medium may be read by drivers of a hard disk drive, an optical disc drive, a flexible disc drive, a silicon disc drive, a cassette media reader or the like, for instance. In this case, the recording medium may be a hard disk, an optical disc, a flexible disc, a compact disc, a digital versatile disc, a semiconductor memory and the like, for instance.

The video storing portion 191 (corresponding to the video storage unit) stores a certain channel of video information received by the video recording portion 111 via the receiving portion 15, in association with program name information and recording date and time information. The TV program information stored in the video storing portion 191 is read out by the name extracting portion 114.

The period storing portion 121 stores a predetermined period information set by the period setting portion 112, which is a period of time for extracting TV programs to be targets of the batch recording reservation. The predetermined period information stored in the period storing portion 121 is read out by the name extracting portion 114.

The program guide storing portion 122 stores an electronic program guide (EPG) obtained by the program guide obtaining portion 115. The electronic program guide is a table list of broadcasting TV programs in a certain period of time (usually one week) of individual broadcasting dates, individual channels, and individual time zones. The program guide stored in the program guide storing portion 122 is read out by the program decision portion 116 and the recording reservation portion 117.

The video recording portion 111 receives a certain channel of broadcasting wave via the receiving portion 15 based on an operational input accepted from a user via the remote controller 3 and records video information of the received channel in association with program name information and recording date and time information in the video storing portion 191.

More specifically, the video recording portion 111 records a certain channel of video information received via the receiving portion 15 in association with the program name information and the recording date and time information in the video storing portion 191 when the recording key 31 (see FIG. 2) of the remote controller 3 is pressed. In addition, if the schedule recording is set by the recording reservation portion 117, the video recording portion 111 sets the tuner portion 152 of the receiving portion 15 to a channel corresponding to the TV program for which the schedule recording is set (hereinafter referred to as a "reserved TV program") so as to receive the reserved TV program on a starting date and time of the reserved TV program, and it records the received video information in association with the program name information and the recording date and time information in the video storing portion 191.

The period setting portion 112 (corresponding to a part of the period setting unit) sets a predetermined period that is a period of time for extracting TV programs to be targets of the batch recording reservation based on an operational input accepted from a user via the remote controller 3 and records the set predetermined period information in the period storing portion 121.

The batch recording accepting portion 113 (corresponding to a part of the batch recording accepting unit) receives the batch recording reservation that is an operational input for making a set of recording reservations of TV programs corresponding to the TV program that has been recorded in a predetermined period of time that is set in advance stored in the period storing portion 121 based on an operational input accepted from a user via the remote controller 3. In this embodiment, the batch recording accepting portion 113 receives the batch recording reservation when pressing down of the batch recording reservation key 32 of the remote controller 3 is accepted.

When the batch recording reservation is accepted by the batch recording accepting portion 113, the name extracting portion 114 (corresponding to the name extracting unit) extracts recorded program name information from the video storing portion 191. The recorded program name information is the program name information of TV programs that are recorded in the predetermined period of time stored in the period storing portion 121 (e.g., one week before the time point when the batch recording accepting portion 113 has accepted the batch recording reservation) among the video information stored in the video storing portion 191.

The program guide obtaining portion 115 (corresponding to the program guide obtaining unit) obtains the electronic program guide (EPG) via the receiving portion 15 and records it in the program guide storing portion 122.

The program decision portion 116 (corresponding to the TV program decision unit) decides whether or not the electronic program guide of the coming week in this embodiment stored in the program guide storing portion 122 includes program name information matching with the recorded program name information extracted by the name extracting portion 114 (i.e., whether or not TV programs to be broadcasted in the coming week includes the TV program having the program name information matching with the recorded program name information).

If the program decision portion 116 decides that program name information matching with the recorded program name information is included in the electronic program guide, i.e., that the TV programs in the electronic program guide to be broadcasted include the TV program having the program name information matching with the recorded program name information, the recording reservation portion 117 (corresponding to the recording reservation unit) reserves recording of the TV program corresponding to the program name information in the electronic program guide stored in the program guide storing portion 122.

When at least one recorded program name information is extracted by the name extracting portion 114, the reservation status displaying portion 118 (corresponding to the reservation status display unit) displays recording reservation flag information on the display 21 in association with the recorded program name information extracted by the name extracting portion 114. The recording reservation flag information indicates whether or not the recording reservation portion 117 has reserved the recording.

In addition, the reservation status displaying portion 118 displays scheduled recording date and time information of the TV program for which a recording reservation is made and channel number information indicating a broadcasting channel number on the display 21 in association with the recorded program name information extracted by the name extracting portion 114.

Figure 4:
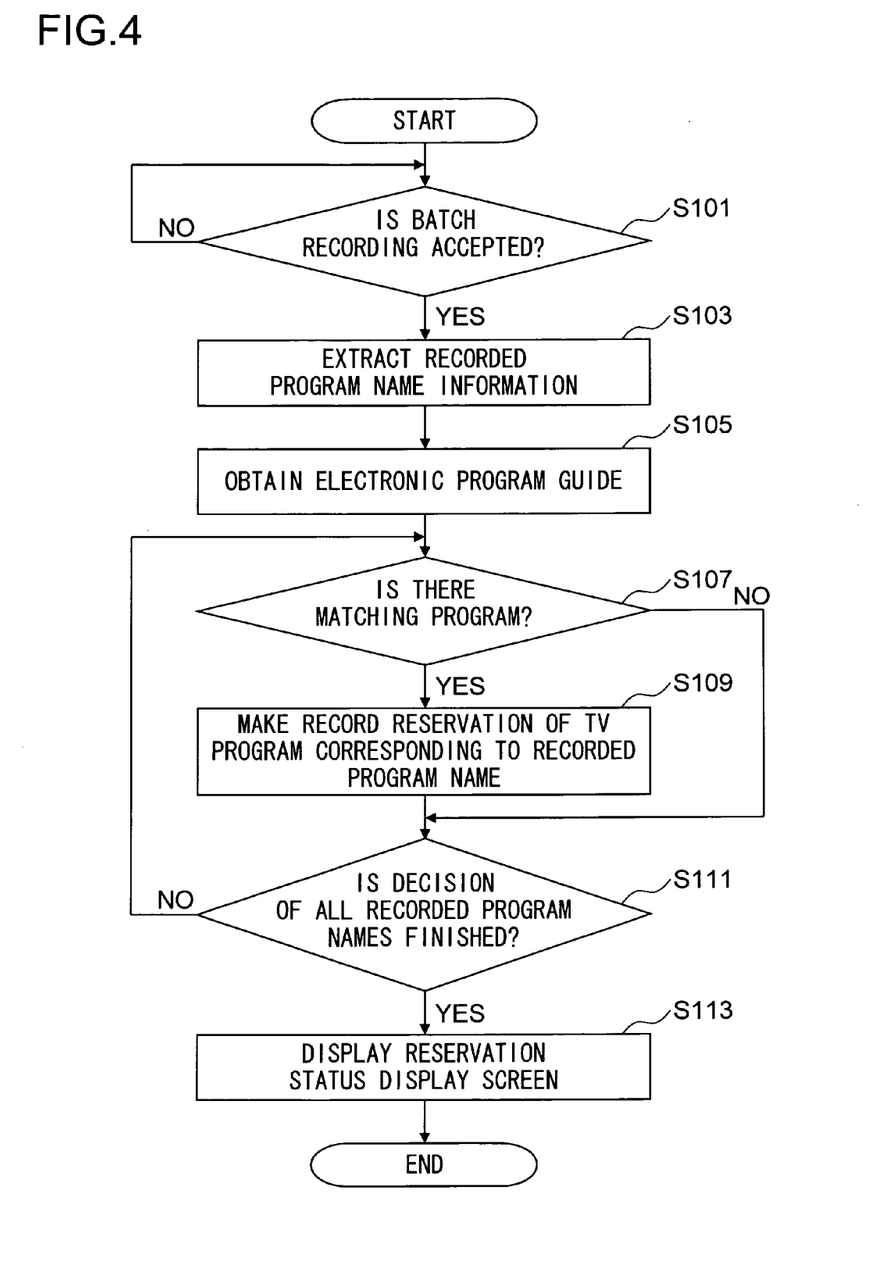
FIG. 4 is a flowchart showing an example of an action of a MPU 11 of the HDD recorder.

FIG. 4 is a flowchart showing an example of an action of the MPU 11 of the HDD recorder. Furthermore, for convenience sake, this embodiment will describe the case where the TV program information received via the receiving portion 15, i.e., the video information, the program name information, the recording date and time information and the like are stored in the video storing portion 191 in advance by the video recording portion 111, and the predetermined period of time is set and stored in the period storing portion 121 in advance by the period setting portion 112.

First, it is decided whether or not the batch recording accepting portion 113 has accepted pressing down of the batch recording reservation key 32 of the remote controller 3 (S101). If it is decided that pressing down of the batch recording reservation key 32 has not been accepted (NO in S101), the process becomes a waiting state. If it is decided that the pressing down of the batch recording reservation key 32 has been accepted (YES in S101), the name extracting portion 114 extracts recorded program name information from the video storing portion 191 (S103).

Then, the program guide obtaining portion 115 obtains the electronic program guide via the receiving portion 15 (S105). Next, it is decided by the program decision portion 116 whether or not the electronic program guide obtained in the step S105 includes the program name information matching with the recorded program name information extracted in the step S103 (S107). If it is decided that the matching program name information is not included (NO in S107), the process goes to the step S111.

If it is decided that the matching program name information is included (YES in S107), recording of the TV program corresponding to the program name information matching with the recorded program name information is reserved by the recording reservation portion 117 (S109). Then, the program decision portion 116 decides whether or not the decision whether or not the matching program name information is included in the electronic program guide, i.e., the decision performed in the step S107 is competed for all the recorded program name information extracted in the step S103 (S111).

If it is decided that the decision performed in the step S107 is not completed for all the recorded program name information (NO in S111), the process goes back to the step S107 so that the process of the step S107 and the subsequent steps is performed repeatedly. If the decision performed in the step S107 is completed for all the recorded program name information (YES in S111), the recording reservation flag information, which indicates whether or not the recording has been reserved in the step S109, is displayed on the display 21 by the reservation status displaying portion 118 in association with the recorded program name information extracted in the step S103 (S113). Then, the process is finished.

Figure 5A:
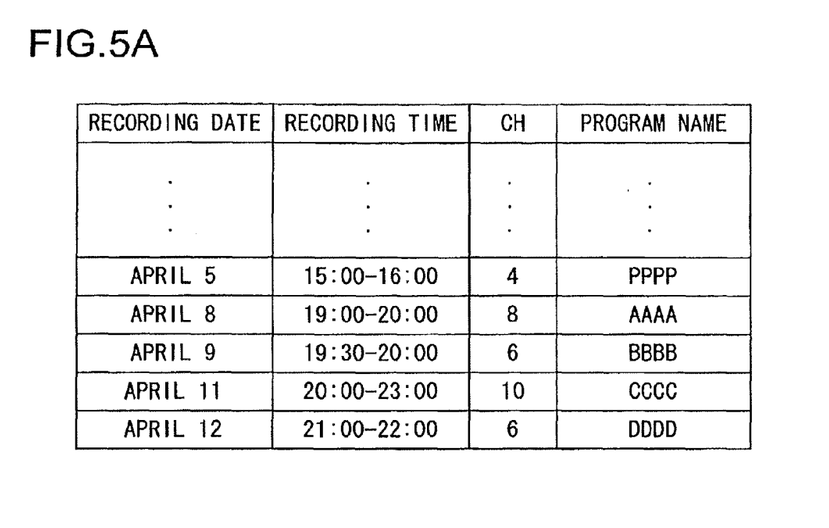
FIG. 5A is a table showing an example of TV program information stored in a video storage unit.

FIG. 5A is a table showing an example of TV program information stored in a video storing portion 191. Recording date, recording time (recording start time and recording end time), a channel number and a TV program name are described in the table from the left side in turn. In this embodiment, contents of the TV program information in the table are described in the time order of the recording date and time from the earliest one.

Figure 5B:
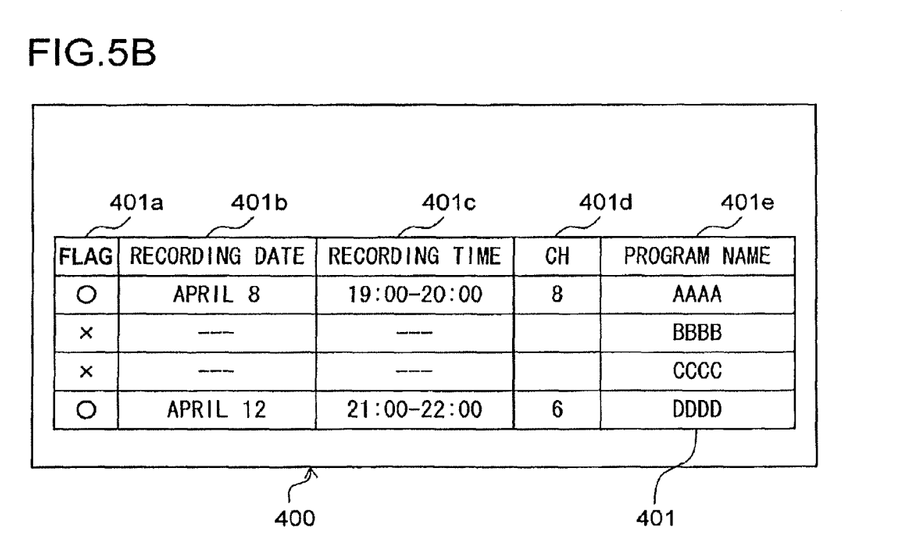
FIG. 5B is a screen diagram showing an example of a batch recording reservation status display screen that is displayed on a display in the step S113 in the flowchart shown in FIG. 4.

FIG. 5B is a screen diagram showing an example of a batch recording reservation status display screen that is displayed on the display 21 in the step S113 in the flowchart shown in FIG. 4. This embodiment will describe the case, for convenience sake, where the date and time when the pressing down of the batch recording reservation key 32 is accepted in the step S101 of the flowchart shown in FIG. 4 is 20:00 on April 13, and the predetermined period of time is set to be one week.

In this case, the recorded program name information extracted in the step S103 of the flowchart shown in FIG. 4 is the program name information of the TV programs recorded from 20:00 on April 6 to 20:00 on April 13, i.e., the TV programs recorded in the video storing portion 191. Therefore, among the TV programs shown in FIG. 5A, the program name information of the TV programs from the bottom row to the fourth row from the bottom is extracted as the recorded program name information.

As to the batch recording reservation status display screen 400, a recording reservation status displaying portion 401 is displayed on the lower part of the screen. In the recording reservation status displaying portion 401, a recording reservation flag displaying portion 401a, a scheduled recording date displaying portion 401b, a scheduled recording time displaying portion 401c, a channel number displaying portion 401d, and a TV program name displaying portion 401e are displayed in turn from the left side.

The recording reservation flag displaying portion 401a displays the recording reservation flag information indicating whether or not a recording reservation is made by the recording reservation portion 117. Since the program name information matching with the recorded program name information is included in the electronic program guide describing TV programs to be broadcasted from 20:00 on April 13 to 20:00 on April 20, the mark "◯" is displayed if a recording reservation is made. If the program name information matching with the recorded program name information is not included in the electronic program guide and recording is not reserved, the mark "x" is displayed. The scheduled recording date displaying portion 401b, the scheduled recording time displaying portion 401c, and the channel number displaying portion 401d display the scheduled recording date, the scheduled recording time, and the channel number, respectively, when a recording reservation is made by the recording reservation portion 117. The TV program name displaying portion 401e displays the TV program name corresponding to recorded program name information extracted by the name extracting portion 114.

In this way, video information corresponding to a plurality of TV programs received via the receiving portion 15 is stored in the video storing portion 191 in association with the program name information and the recording date and time information. Then, the batch recording reservation is accepted based on an operational input received from a user via the remote controller 3. The batch recording reservation is an operational input for making a set of recording reservations of TV programs corresponding to the TV program recorded in a predetermined period of time that is set in advance (one week before the time point when the batch recording reservation has been accepted in this embodiment). Then, if the batch recording reservation is accepted, the recorded program name information that is program name information of the TV program recorded in the predetermined period of time among video information stored in the video storing portion 191 is extracted from the video storing portion 191. In addition, the electronic program guide is obtained via the receiving portion 15, and it is decided whether or not the obtained electronic program guide includes the program name information matching the extracted recorded program name information. If it is decided that the program name information matching with the recorded program name information, the obtained electronic program guide is used for reserving the recording of the TV program corresponding to the program name information, so that the recording reservation can be performed with good usability.

More specifically, when the batch recording reservation is accepted, the recorded program name information that is program name information of the TV program recorded in a predetermined period of time among the video information stored in the video storing portion 191 is extracted from the video storing portion 191, and it is decided whether or not the program name information matching with the extracted recorded program name information is included in the electronic program guide. If it is decided that the program name information matching with the recorded program name information is included, recording of the TV program corresponding to the program name information is reserved. Since a set of recording reservation is made for TV programs having the program name information matching with the recorded program name information as the program name information included in the electronic program guide among the TV programs recorded in the predetermined period of time, it is not necessary to perform the recording reservation for each TV program so that the recording reservation can be performed with good usability.

In addition, when the batch recording reservation key 32 (see FIG. 2) of the remote controller having a plurality of keys is pressed, the batch recording reservation is accepted. Therefore, the recording reservation can be performed with better usability.

In addition, when at least one recorded program name information is extracted, the recording reservation flag information that is information indicating whether or not the recording reservation is made in association with the extracted recorded program name information is displayed on the display 21 (see FIG. 5B). Therefore, recording reservation can be performed with better usability.

More specifically, since the recording reservation flag information indicating whether or not recording reservation is made for the TV program that was recorded in a predetermined period of time is displayed on the display 21, the user can visually checks whether or not recording of the desired TV program is reserved for the schedule recording. Therefore, recording reservation can be performed with better usability.

In addition, when the recording reservation is made, scheduled recording date and time information of the TV program to be recorded and the channel number information as a broadcasting channel number are displayed on the display 21 in association with the extracted recorded program name information (see FIG. 5B). Therefore, the recording reservation can be performed with better usability.

More specifically, since the extracted recorded program name information, the scheduled recording date and time information of the TV program to be recorded, and the channel number information as a broadcasting channel number are displayed when the recording reservation is made, the user can check whether or not the TV program that is reserved for recording matches the desired TV program for setting the schedule recording by using the scheduled recording date and time information and the channel number information as a broadcasting channel number. Therefore, the recording reservation can be performed with better usability.

In addition, since a predetermined period of time for extracting TV programs to be targets of the batch recording reservation is set based on the operational input received from a user via the remote controller 3, the user can set a desired predetermined period of time arbitrarily. Therefore, the recording reservation can be performed with better usability.

More specifically, a user who often makes the batch recording reservation can set a relatively short period of time (e.g., three days) as the predetermined period of time while a user who seldom makes the batch recording reservation can set a relatively long period of time (e.g., a week) as the predetermined period of time. Therefore, the recording reservation can be performed with better usability.

Note that the present invention can be also applied to the following structures.

(A) Although the above embodiment describes the case where the broadcasting recording apparatus is the HDD recorder 1 having a structure for receiving digital broadcasting and storing information there of in the HDD 19, it is sufficient that the broadcasting recording apparatus is an apparatus for receiving television broadcast and for storing the received video information. For instance, the broadcasting recording apparatus can be a DVD recorder, a video cassette recorder or the like.

(B) Although the above embodiment describes the case where the MPU 11 includes the functional portions such as the video recording portion 111, the period setting portion 112, the batch recording accepting portion 113, the name extracting portion 114, the program guide obtaining portion 115, the program decision portion 116, the recording reservation portion 117, the reservation status displaying portion 118 and the like as software, it is possible that at least one functional portion of the video recording portion 111, the period setting portion 112, the batch recording accepting portion 113, the name extracting portion 114, the program guide obtaining portion 115, the program decision portion 116, the recording reservation portion 117 and the reservation status displaying portion 118 be realized by hardware such as a circuit.

What is claimed is:

1. A broadcasting recording apparatus, comprising:
   a receiving processor adapted to demodulate received television broadcast;
   a memory connected to the receiving processor, in which video information associated with program name information and recording date and time information is stored;
   an operation processor including an input acceptor adapted to accept a batch recording reservation; and
   a controller controllably connected to the receiving processor and the memory, and adapted to execute the batch recording reservation in response to an instruction from the operation processor,
   wherein
   in response to the instruction to execute the batch recording reservation from the operation processor, the controller identifies, based on a target period set in advance and the recording date and time information but irrespective of the program name information, video information recorded in the target period out of the video information stored in the memory,
   the controller extracts the program name information of the identified video information as recorded program name information, and
   when program name information matching with the extracted recorded program name information is included in an electronic program guide obtained via the receiving processor, the controller reserves recording of a TV program corresponding to that program name information,
   wherein
   the operation processor includes a remote controller, and the input acceptor is a batch recording reservation key of the remote controller.

2. The broadcasting recording apparatus according to claim 1, wherein the apparatus is connected to a monitor for displaying video information for communicating with each other, and the controller causes status of recording reservations based on the batch recording reservation to be displayed on the monitor.

3. The broadcasting recording apparatus according to claim 2, wherein, when causing the status of recording reservations to be displayed on the monitor, the controller causes at least one of scheduled recording date and time information and channel number information of the TV program for which a recording reservation is made to be displayed in association with the extracted recorded program name information.

4. The broadcasting recording apparatus according to claim 1, wherein the target period can be set by use of the operation processor.

5. A method of making a batch recording reservation of TV programs in a broadcasting recording apparatus including a video storage unit in which video information associated with program name information and recording date and time information is stored, the method comprising the steps of:

accepting the batch recording reservation;

when the batch recording reservation is accepted, identifying, based on a target period set in advance and the recording date and time information but irrespective of the program name information, video information recorded in the target period out of the video information stored in the video storage unit; extracting the program name information of the identified video information as recorded program name information; and when program name information matching with the extracted recorded program name information is included in an electronic program guide obtained by receiving television broadcast, reserving recording of a TV program corresponding to that program name information;

wherein the broadcasting recording apparatus includes a remote controller, and accepting the batch recording reservation is through a batch recording reservation key of the remote controller.

* * * * *